Sept. 18, 1951 P. W. GARBO ET AL 2,567,932
STAGEWISE PROCESS FOR THE HYDROGENATION
OF CARBON MONOXIDE
Filed April 30, 1948
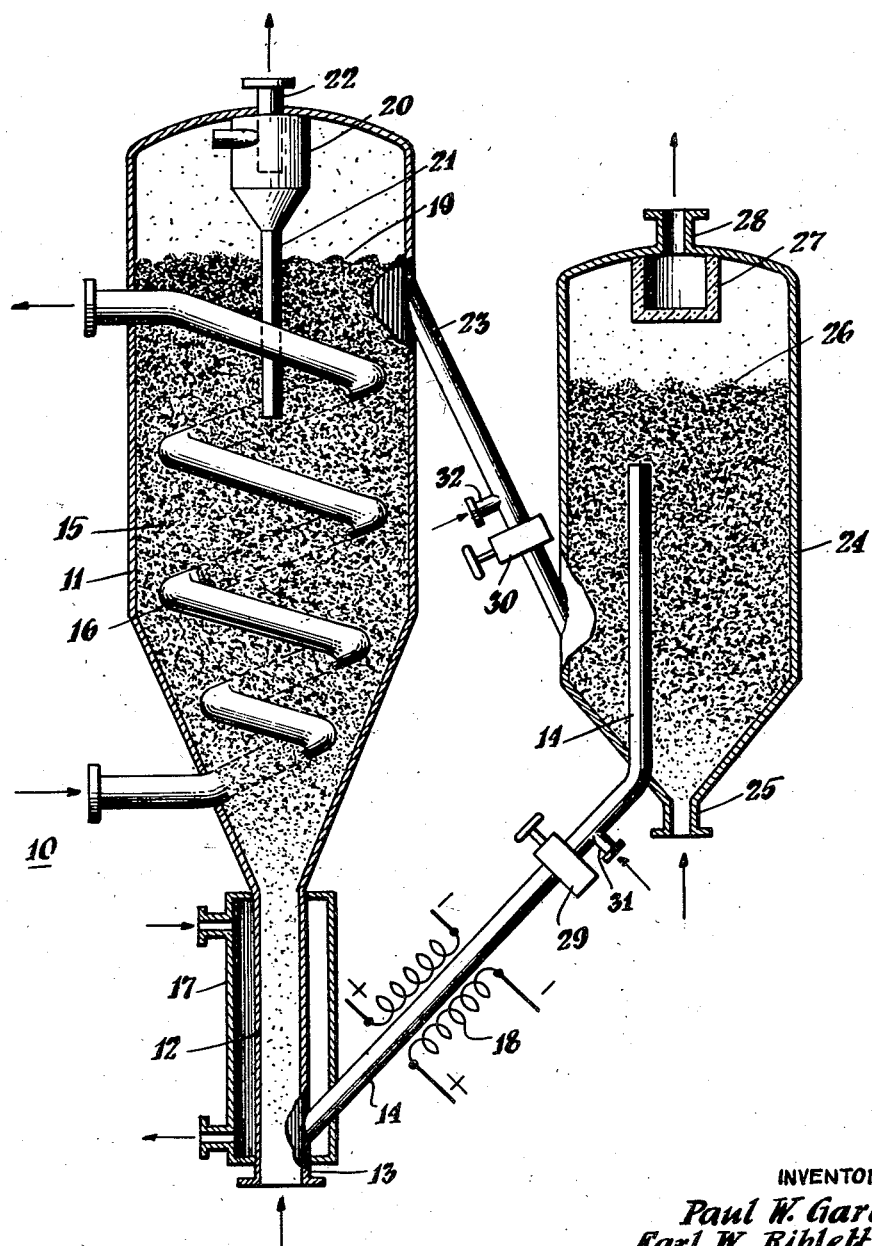
INVENTORS
Paul W. Garbo
Earl W. Riblett
BY Daniel Stryker
J. H. Grahame
ATTORNEY Patented Sept. 18, 1951

2,567,932

UNITED STATES PATENT OFFICE 2,567,932

STAGEWISE PROCESS FOR THE HYDROGEN-
ATION OF CARBON MONOXIDE

Paul W. Garbo, Freeport, N. Y., and Earl W.
Riblett, Tenafly, N. J., assignors to Hydrocarbon
Research, Inc., New York, N. Y., a corporation
of New Jersey Application April 30, 1948, Serial No. 24,124

14 Claims. (Cl. 260—449.6)

This invention relates to the catalytic synthesis of hydrocarbons and oxygenated hydrocarbons from carbon monoxide and hydrogen. More particularly, the invention pertains to such synthesis conducted in two steps or stages.

The synthesis art includes several proposals of catalytic processes for the production of hydrocarbons and related organic compounds in two or more stages arranged in series. Such stagewise operations involve feeding of synthesis gas, namely, a mixture of carbon monoxide and hydrogen, into a first reaction stage wherein a fraction of the synthesis gas is converted to organic compounds and passing the unreacted portion of the synthesis gas from the first reaction stage to at least one succeeding stage wherein another fraction of the synthesis gas is converted to organic compounds. The stagewise process of this invention bears no relation to these prior multistage processes and should not be confused therewith.

The two-stage process of our invention is based on the discovery that the catalytic synthesis of organic compounds from carbon monoxide and hydrogen is explainable in terms of essentially two reactions:

(A) $CO + 2H_2 \rightarrow CH_2= + H_2O$
(B) $n(CH_2=) \rightarrow -CH_2-CH_2-CH_2 \ldots CH_2-$

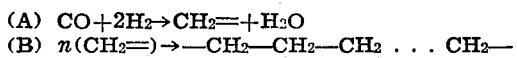

Reaction A accounts for the generation of methylene groups ($CH_2=$) on the surfaces of the catalyst mass while reaction B shows that the methylene groups are poymerized to organic compounds of relatively high molecular weight. Since the freshly generated methylene groups are free radicals, they are strongly adsorbed on the surfaces of the synthesis catalyst; however, as the methylene groups polymerize to compounds of high molecular weight, the free valences decrease and the resulting compounds are not strongly adsorbed on the catalyst surfaces so that the compounds are readily separated from the catalyst mass.

We have further found that optimum conditions for reaction A differ from those for reaction B. It is therefore clear that prior synthesis processes wherein the generation of methylene groups and their polymerization to organic compounds proceed simultaneously are handicapped because the reaction conditions are necessarily a compromise between the optimum conditions for reaction A and those for reaction B.

The process of our invention is conducted in two stages. The synthesis gas entering the first stage is exposed to conditions favoring the generation of methylene groups. The thus formed methylene groups are promptly thereafter subjected to conditions promoting polymerization to yield desired organic compounds.

The time of contact in the first stage is made very short so that substantially only the generation of methylene groups occurs therein. The time should be short enough to prevent appreciable polymerization. While it is preferred to operate in such manner that substantially no organic compounds are produced within the first stage, a small proportion, say up to about 10%, of the charged carbon monoxide may be permitted to go the whole way to organic compounds in the first stage. The time of contact will, of course, be different for different reaction conditions, principally catalysts, temperatures and pressures. However, the contact time in the first stage is in general less than 1 second and frequently less than 0.1 second.

One of the chief objectives in conducting the synthesis of organic compounds in two stages pursuant to this invention is the use of relatively high temperatures in the first stage to promote the rapid generation of methylene groups. Again, the particular temperature selected in any given case will depend on other reaction conditions like catalyst activity and pressure. For most instances, a temperature of at least 700° F. is maintained in the first stage; preferably the temperature is in the vicinity of 1000° F. With available catalysts, the maximum temperature of the first stage appears to be in the vicinity of 1200° F.

In brief, the first reaction stage of our process is characterized by a short contact time and a high temperature. In contrast thereto, the second stage involves a relatively long contact time and a relatively low temperature to effect the polymerization of the generated methylene groups to desired organic compounds.

For further clarification of the invention, reference is now made to the accompanying drawing which forms a part of this application and illustrates an arrangement of apparatus suitable for the conduct of the process of our invention.

Reactor 10 comprises an upper polymerizing zone 11 and a lower generating zone 12 wherein methylene groups are formed. Generating zone 12 is of small horizontal cross-section as compared with the horizontal cross-section of the polymerizing zone 11 so that synthesis gas, i. e., a gas containing hydrogen and carbon monoxide, fed into zone 12 through inlet 13 passes through zone 12 at high velocity and discharges into zone 11 wherein the velocity is markedly reduced.

A standpipe 14 is connected with zone 12 to supply thereto the synthesis catalyst in solid particle form. The high velocity gas stream entering at inlet 13 sweeps the catalyst particles fed from standpipe 14 through zone 12 into zone 11 where because of the decrease in the gas velocity the catalyst particles form a dense fluidized bed 15. In the short time that the synthesis gas and catalyst are in zone 12, the reaction proceeds to generate predominantly methylene groups on the surfaces of the catalyst particles. As the catalyst particles with adsorbed methylene groups enter the fluidized mass 15 in zone 11, the polymerizing reaction is preferentially promoted, principally by a reduction in the reaction temperature. Polymerizing zone 11 is provided with a heat exchanger 16 and generating zone 12 with exchanger 17 so that the desired temperatures for the two reactions taking place in these zones may be maintained; as previously mentioned, the temperature employed in generating zone 12 is appreciably higher than that in polymerizing zone 11. If desired, the catalyst particles charged into zone 12 by way of standpipe 14 may be preheated, for example, by electrical resistance heaters 18 associated with standpipe 14.

A gaseous effluent containing the products of reaction becomes separated from the bulk of the fluidized catalyst at the pseudo-liquid level 19. The gaseous effluent flows into and through cyclone separator 20 which removes any entrained catalyst particles and returns them by way of standpipe 21 to the fluidized bed 15. The gaseous effluent substantially free of catalyst particles is withdrawn from outlet 22 and made to flow to a conventional recovery plant for separating the products of reaction into desired fractions.

As the polymerizing reaction goes forward in zone 11, the catalyst particles lose the adsorbed methylene groups which were generated in zone 12. Thus freed of methylene groups but usually containing some adsorbed reaction products, e. g., high-boiling hydrocarbons, the catalyst particles flow down standpipe 23 into stripper 24 wherein they are fluidized by a stripping gas such as hydrogen, carbon dioxide, methane or steam supplied through inlet 25. The stripping gas along with hydrocarbons and the like stripped from the catalyst particles emerges from the fluidized mass in vessel 24 at the pseudo-liquid level 26 and passes through filter 27, e. g., porous Alundum, which separates entrained catalyst particles from the gaseous stream. The filtered gases leave vessel 24 through outlet 28 and may be combined with the gaseous stream withdrawn from outlet 22 or may be separately treated in conventional apparatus to recover therefrom the stripped hydrocarbons or other reaction products. The stripping gas, after the stripped reaction products have been removed, may be recycled to vessel 24 by way of inlet 25.

The catalyst particles stripped or freed of adsorbed reaction products flow into standpipe 14 which conveys the particles to zone 12 as hereinbefore stated. The cyclic flow of catalyst particles through standpipe 14, zone 12, zone 11, standpipe 23, stripper 24 and back into standpipe 14 is controlled by slide-valves 29 and 30 in standpipes 14 and 23, respectively. Tap 31 serves for the introduction of a gas such as hydrogen or carbon dioxide into standpipe 14 so that the catalyst particles therein are maintained in a free-flowing condition. Similarly, tap 32 is used for the injection of gas to prevent the clogging of standpipe 23 by the catalyst particles flowing into it from zone 11.

For an exemplary operation of the foregoing apparatus, a gaseous stream containing by volume about 52.9% $H_2$, 17.6% CO, 14.9% $CO_2$, 7.2% $N_2$, 7.0% $C_1$ and $C_2$ hydrocarbons and 0.4% moisture and preheated to a temperature of about 800° F. is charged through inlet 13 at a pressure of about 425 lbs. per sq. in. gauge into generating zone 12. A synthesis catalyst comprising essentially powdered iron (about 95% by weight through 200 mesh and about 80% through 325 mesh) promoted with about 2 to 3% by weight of potassium oxide ($K_2O$) and alumina ($Al_2O_3$), is fed, after being preheated to a temperature of about 800° F. by heater 18, from standpipe 14 into zone 12. The velocity of the gas flowing up through zone 12 is approximately 25 feet per second so that the catalyst flowing from standpipe 14 into zone 12 is blown therethrough into zone 11 which is of such enlarged horizontal cross-section that the gas velocity is decreased to about 1 foot per second and the catalyst particles assume a fluidized condition because of slippage or hindered settling at the decreased gas velocity.

Generating zone 12 is 2 feet in length so that the residence time of the synthesis gas and entrained catalyst therein is about 0.08 second. A temperature of 1050° F. is maintained in zone 12 by circulating a heat transfer medium like mercury or a mixture of diphenyl and diphenyl ether through exchanger 17.

The first stage of our process is completed as the gas stream and suspended catalyst discharge from zone 12 into zone 11. In this first stage, the reaction is principally the generation of methylene groups, only about 7% of the charged synthesis gas being converted to hydrocarbons and related organic compounds like aldehydes and ketones.

The gas stream and entrained catalyst at a temperature of about 1050° F. flow from zone 12 into the large fluidized mass 15 maintained at a temperature of 550° F. by water or other coolant passed through exchanger 16. Accordingly, the gas and catalyst discharging from zone 12 are quenched in zone 11 to a temperature favorable to the polymerizing reaction by which the methylene groups are converted to hydrocarbons and like compounds. The fluidized bed 15 is about 10 feet deep so that the residence time of the gas in zone 11 is approximately 10 seconds. During the polymerizing reaction, the bulk of the hydrocarbons and like compounds which are evolved become desorbed from the catalyst surfaces and emerge from the fluidized bed 15 together with the gases such as carbon dioxide, methane, hydrogen and water vapor passing therethrough. The combined gases leave reactor 10 by way of separator 20 and outlet 22 and flow to a recovery plant wherein the reaction products are separated.

It is found that 98.5% of the carbon monoxide in the fresh synthesis gas supplied to the reaction system has been converted to organic compounds and carbon dioxide by the described operation, the yield of $C_3$ and heavier hydrocarbons including minor proportions of oxygenated compounds corresponding to about 80% of the carbon monoxide in the fresh synthesis gas. After the hydrocarbons, a small quantity of oxygenated compounds and reaction water have been removed from the gaseous effluent leaving the reaction system, there remains a tail gas comprising 41.7% $H_2$, 3.1% CO, 28.2% $CO_2$, 12.5% $N_2$, 14.1% $C_1$ and $C_2$ hydrocarbons and 0.4% moisture which may be utilized as a fuel gas. In the present example, part of this tail gas is recycled to reactor 10; each volume of recycled tail gas is admixed with one volume of fresh synthesis gas containing 64% H₂ and 32% CO and minor proportions of carbon dioxide, nitrogen and moisture to yield the aforementioned synthesis gas stream which is charged into zone 12 through inlet 13.

The catalyst particles with minor proportions of adsorbed reaction products flow through standpipe 23 into stripper 24 wherein they are fluidized by a stream of the aforementioned tail gas entering at inlet 25. While the stripping of adsorbed products may be conducted at a temperature equal to or higher than that prevailing in zone 11, we find it advantageous, as fully disclosed and claimed in our copending application Serial No. 733,414, filed March 8, 1947, to operate the stripper 24 at a temperature at least about 50° F. below the temperature in zone 11; specifically, in the present example, the fluidized catalyst in stripping vessel 24 is maintained at a temperature of about 490° F. The desorbed or stripped reaction products are conveyed out of vessel 24 by the stripping gas exiting from outlet 28 and are recovered therefrom by conventional methods such as scrubbing with an absorbing oil.

The catalyst particles substantially free of adsorbed material flow into and down standpipe 14 and as previously stated, are preheated by heater 18 to a temperature of 800° F. before discharging into zone 12 where the catalyst starts another cycle of flow through the reaction system.

At the temperature of 550° F. and pressure of about 425 lbs. per sq. in. gauge existing in polymerizing zone 11, the iron synthesis catalyst promotes little, if any, synthesis in the sense of forming hydrocarbons and like compounds directly from the hydrogen and carbon monoxide. On the other hand, these conditions are conducive to the polymerization of methylene groups generated in zone 12 to hydrocarbons of high antiknock value. It is thus seen that our two-stage process is particularly attractive for the production of high quality motor fuels.

Any of the known synthesis catalysts, chiefly iron, nickel, cobalt and ruthenium catalysts, may be selected for use in our two-stage process. As is known, the pressure and temperature maintained in the synthesis reaction zone is largely dictated by the type of catalyst employed. Thus, for instance, a cobalt catalyst is typically used at a pressure in the range of atmospheric to about 150 lbs. per sq. in. gauge and a temperature in the range of about 300 to 400° F. while an iron catalyst is typically used at a pressure in the range of about 200 to 500 lbs. per sq. in. gauge and temperature in the range of about 500 to 650° F. Our process is generally carried out at the pressures indicated by the prior art for the various catalysts. However, as hereinbefore stated, the reaction temperatures given in prior teachings for the several catalyst are, in effect, compromises between the temperatures most favorable to the generation of methylene groups and those most favorable to the polymerization of the methylene groups for the catalysts involved. Accordingly, such prior teachings of reaction temperatures are not directly applicable to our two-stage process but are indicative of suitable temperatures because, as has been illustrated by the specific examples, the first or methylene generating step is operated at temperatures higher than temperatures used in conventional practice and the second or polymerizing step at temperatures lower than said conventional temperatures. A further guide in the selection of suitable temperatures for any given catalyst to be used in our process is the observation that generally the first stage temperature is at least 300° F., preferably at least 450° F., higher than the second stage temperature.

While low temperatures are desirable in the second or polymerizing stage of our process, the lowest temperature in any given case is set to avoid liquefaction of the reaction products within the polymerizing zone. Furthermore, these low temperatures should also take into account the character of the reaction products desired. Thus, if gasoline-type hydrocarbons are desired, too low a polymerizing temperature should not be used since the formation of heavy hydrocarbons would then be promoted.

Iron synthesis catalysts are preferred for the process of this invention. As known to those skilled in the art, iron catalysts have heretofore shown the disadvantage of promoting the synthesis reaction to a large extent according to the following equation:

(C)     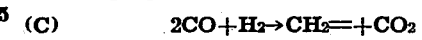

rather than according to reaction A hereinbefore set forth. Reaction C is obviously undesirable since it wastes carbon monoxide in the formation of by-product carbon dioxide. We have learned that reaction C is really the result of two reactions, viz., reaction A and the water gas shift reaction:

(D)     

to which water vapor is supplied by reaction A. Iron catalysts require higher operating temperatures than do cobalt and nickel catalysts and these higher temperatures promote the conversion of carbon monoxide to carbon dioxide in accordance with reaction D. This inherent propensity of iron catalysts to waste carbon monoxide in the formation of by-product carbon dioxide is very materially circumvented in the process of this invention. Accordingly, the invention has the additional feature of permitting the use of the cheaper iron catalysts without encountering the usual excessive formation of by-product carbon dioxide.

The last mentioned advantage of our invention, we believe, is theoretically explainable on the ground that in the first stage of our process the temperature is so high and consequently the reaction equilibrium constant so low that reaction D does not go forward to any appreciable degree and in the second stage the temperature is so low that the reaction equilibrium is not reached within the limited residence time of the gaseous reactants in the second stage. Whatever the true explanation may be, it suffices to say that operating in accordance with the principles of this invention iron catalysts can be made to synthesize hydrocarbons and related oxygenated products without forming any more by-product carbon dioxide than is ordinarily formed with nickel or cobalt catalysts.

It will be appreciated that the invention is susceptible to various modifications without departing from its spirit. For instance, while dense phase fluidization is particularly attractive for the second stage, the catalyst may be passed through the second stage as a relatively light or dispersed phase. Similarly, if desired, the catalyst may be returned from the second stage directly to the first stage without going through a separate stripping zone. It is thus seen that all

We claim:

1. In the catalytic synthesis of organic compounds of the class consisting of hydrocarbons and oxygenated hydrocarbons from a mixture of hydrogen and carbon monoxide, the steps which comprise passing a gaseous stream of hydrogen and carbon monoxide containing a solid particle synthesis catalyst through a first reaction zone under reaction conditions including an elevated temperature and a short residence time of not more than about 1 second such that a major portion of the carbon monoxide fed to said first reaction zone is consumed by incomplete reaction with the hydrogen to generate methylene groups adsorbed on the surfaces of said catalyst without completely converting more than 10 percent of said carbon monoxide into said organic compounds during passage of said gaseous stream through said first reaction zone, passing said catalyst with adsorbed methylene groups and the gaseous stream issuing from said first reaction zone through a second reaction zone under reaction conditions including an elevated temperature considerably lower than the temperature in said first reaction zone and a residence time considerably longer than the residence time in said first reaction zone, which reaction conditions in said second reaction zone are substantially ineffective to synthesize said organic compounds directly from hydrogen and carbon monoxide but are effective to polymerize said methylene groups into said organic compounds, withdrawing said catalyst and a gaseous effluent from said second reaction zone, returning the withdrawn catalyst to said first reaction zone, and recovering said organic compounds from the withdrawn gaseous effluent.

2. The process of claim 1 wherein the catalyst withdrawn from said second reaction zone is stripped of adsorbed organic compounds before being returned to said first reaction zone.

3. The process of claim 1 wherein the catalyst passes through said second reaction zone as a dense fluidized mass.

4. The process of claim 1 wherein an iron-type catalyst is used.

5. The stagewise process for the catalytic synthesis of organic compounds of the class of hydrocarbons and oxygenated hydrocarbons from hydrogen and carbon monoxide, which comprises passing a particulate synthesis catalyst and a gaseous stream containing hydrogen and carbon monoxide through a first reaction stage under reaction conditions including a temperature of at least 700° F. and a short residence time adapted to react incompletely a major portion of the carbon monoxide fed to said first stage with hydrogen whereby not more than 10% of the carbon monoxide fed to said first stage is completely converted to said organic compounds during the passage of said catalyst and gaseous stream through said first stage, passing said catalyst and gaseous stream issuing from said first stage through a second reaction stage under reaction conditions including an elevated temperature considerably lower than the aforesaid temperature and a residence time considerably longer than the aforesaid residence time, the second said reaction conditions being adapted to react further said incompletely reacted major portion of the carbon monoxide to evolve said organic compounds, withdrawing said catalyst, said evolved organic compounds and unreacted gas from said second stage, and returning the withdrawn catalyst to said first stage.

6. The process of claim 5 wherein the short residence time in the first stage is not more than about 1 second.

7. The process of claim 5 wherein the elevated temperature of the second stage is at least about 300° F. lower than the temperature of the first stage.

8. The process of claim 5 wherein an iron-type catalyst is used.

9. The process of claim 8 wherein not less than about 80% of the reacted carbon monoxide is recovered in the form of $C_3$ and heavier organic compounds.

10. The stagewise process for the catalytic synthesis of organic compounds of the class of hydrocarbons and oxygenated hydrocarbons from hydrogen and carbon monoxide, which comprises passing a particulate synthesis catalyst and a gaseous stream containing hydrogen and carbon monoxide through a first reaction stage under reaction conditions including a temperature of at least 700° F. and a short residence time adapted to react incompletely a major portion of the carbon monoxide fed to said first stage with hydrogen whereby not more than 10% of the carbon monoxide fed to said first stage is completely converted to said organic compounds during the passage of said catalyst and gaseous stream through said first stage, injecting said catalyst and gaseous stream issuing from said first stage into a second reaction stage wherein said catalyst is maintained as a fluidized bed under reaction conditions including an elevated temperature considerably lower than the aforesaid temperature and a residence time considerably longer than the aforesaid residence time, the second said reaction conditions being adapted to react further said incompletely reacted major portion of the carbon monoxide to evolve said organic compounds, withdrawing catalyst and a gaseous effluent from said fluidized bed, recovering said evolved organic compounds from said gaseous effluent, stripping adsorbed organic compounds from the withdrawn catalyst, and returning the stripped catalyst to said first stage.

11. The process of claim 10 wherein the stripping of adsorbed organic compounds from the catalyst is conducted while said catalyst is maintained in a fluidized condition.

12. The process of claim 10 wherein the stripping of adsorbed organic compounds from the catalyst is conducted at a temperature at least about 50° F. lower than the temperature in the second stage.

13. The process of claim 10 wherein an iron-type catalyst is used.

14. The process of claim 13 wherein the short residence time in the first stage is not more than about 0.1 second.

PAUL W. GARBO.
EARL W. RIBLETT.

REFERENCES CITED

The following references are of record in the file of this patent:

UNITED STATES PATENTS

| Number | Name | Date |
|---|---|---|
| 2,257,293 | Dreyfus | Sept. 30, 1941 |
| 2,338,475 | Wirth et al. | Jan. 4, 1944 |
| 2,417,164 | Huber | Mar. 11, 1947 |
| 2,446,426 | Layng | Aug. 3, 1948 |
| 2,463,912 | Scharmann | Mar. 8, 1949 |